J. GUYER.
Hand-Plow.
No. 27,445.  Patented Mar. 13, 1860.
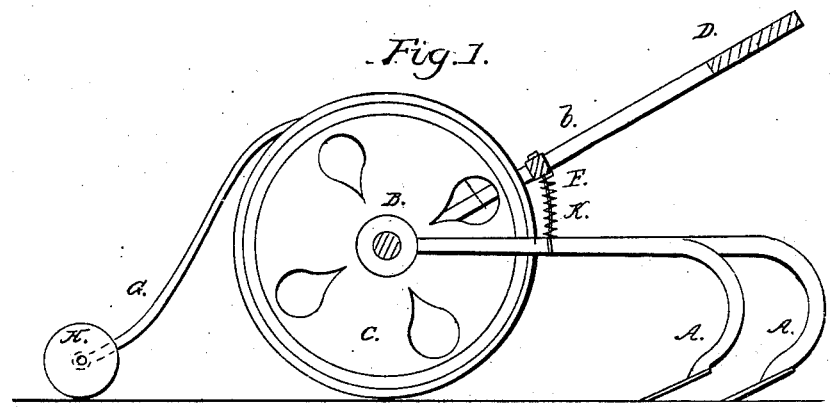
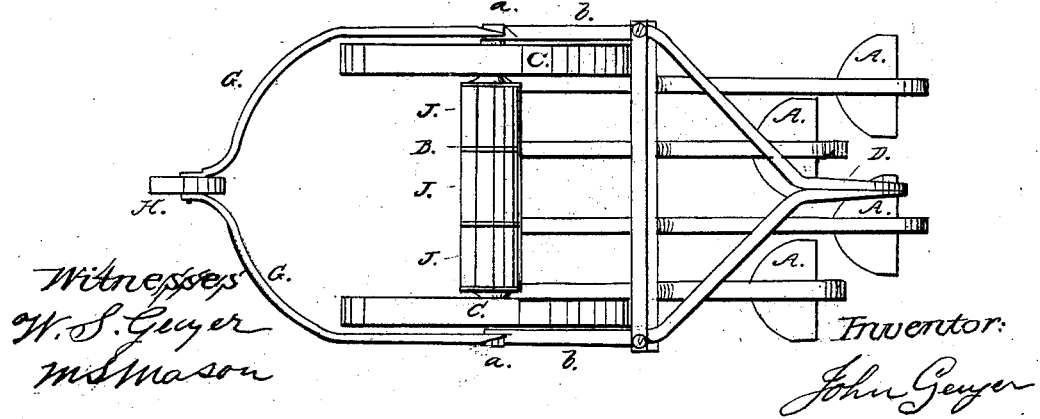

UNITED STATES PATENT OFFICE.

JOHN GUYER, OF WESTPORT, CONNECTICUT.

IMPROVEMENT IN CULTIVATORS.

Specification forming part of Letters Patent No. 27,445, dated March 13, 1860.

*To all whom it may concern:*

Be it known that I, JOHN GUYER, of Westport, in the county of Fairfield and State of Connecticut, have invented a new and Improved Hand-Cultivator; and I do hereby declare that the following is a full, clear, and exact description of the same, reference being had to the accompanying drawings, forming a part of this specification, in which—

Figure 1 represents a longitudinal vertical section of my invention. Fig. 2 is a plan or top view of the same.

Similar letters in both views refer to corresponding parts.

To enable those skilled in the art to make and use my invention, I will proceed to describe it.

The object of this cultivator is to weed between the growing crops, such as potatoes, onions, and root crops in general; and it may also be used for young corn or cotton.

The hoes A are hinged to an axle, B, at convenient distances apart, according to the length of the axle and the number of hoes to be used; and the number of the hoes may be varied as may be found most convenient. The axle B rests on two wheels, C, the distance of which from each other corresponds to the width of ordinary furrows.

Secured to the outside of the axle C by means of screws $a$ is the handle D, the two arms $b$ of which are united close behind the wheels by means of a cross-bar, E, and springs F connect this cross-bar with the several hoes, each hoe being furnished with a separate spring.

When the wheels are propelled by means of the handle D the pressure exerted on the handle forces the wheels down on the ground, and at the same time the hoes are depressed so that they work to the proper depth in the ground. At the same time, if one of the hoes meets with an obstruction it is allowed to rise and pass over it without interfering with the operation of the other hoes.

In front of the wheels C and secured to the deflecting-bars G, right in the center before the axle B, is the guide-roller H, and the bars G are bent up and hinged to the ends of the axle B, as clearly shown in the drawings. As the cultivator is pushed on in the furrows the guide-roller passes under the plants which may hang over into the furrows, and the deflecting-bars G turn the same out of the way, so that they are not injured by the wheels C. The cultivator works very easy, so that it can be operated by hand without difficulty, and that it can be guided to pass through the furrows without injuring the overhanging plants.

Having thus fully described my invention, what I claim as new, and desire to secure by Letters Patent, is—

The arrangement of the hoes A, springs F, guides K, bar E, handle D, axle B, and tubes J, as and for the purposes herein shown and described.

JOHN GUYER.

Witnesses:
W. S. GUYER,
MYRON L. MASON.